UNITED STATES PATENT OFFICE.

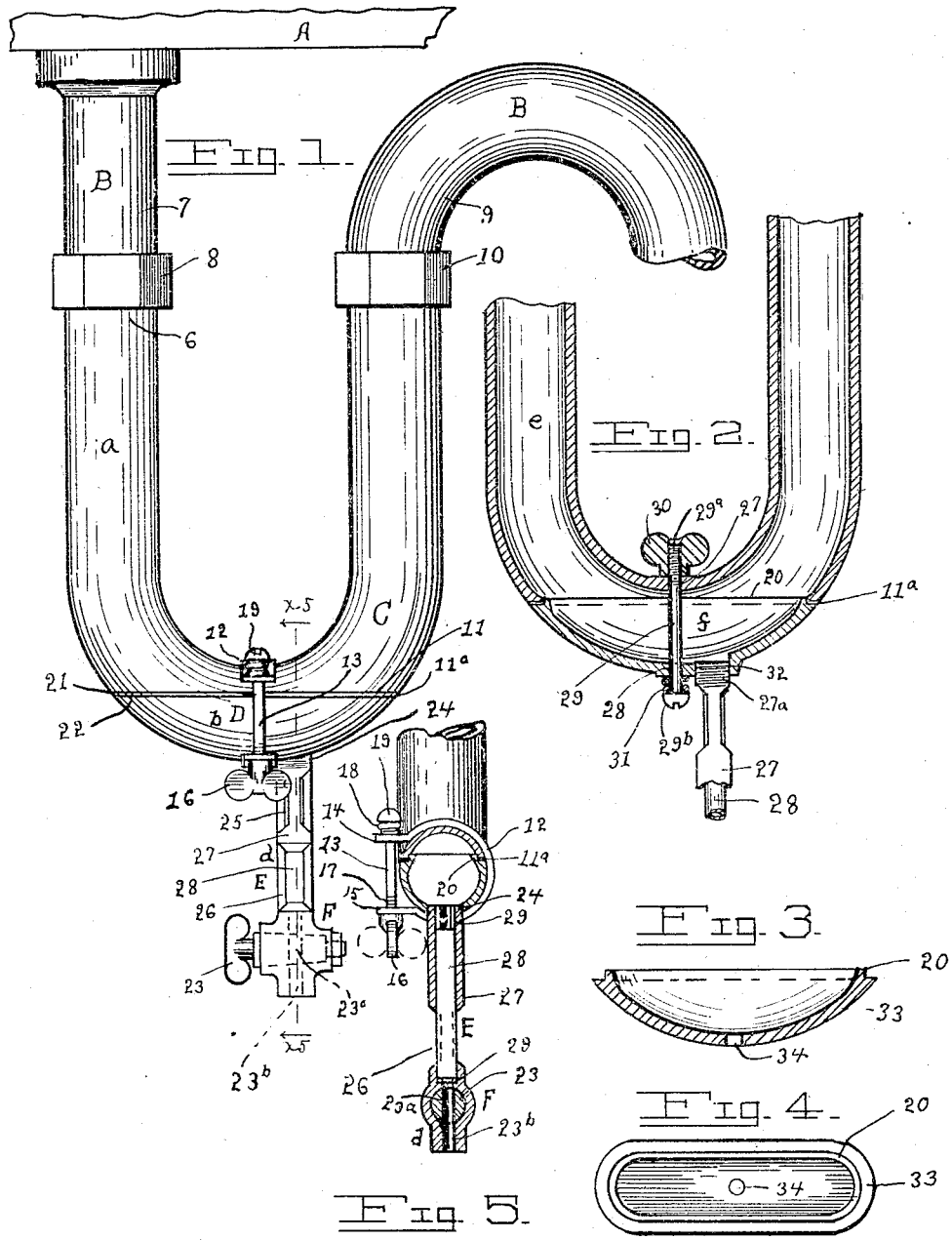

RICHARD PINDER, OF ELFTMAN, AND JOHN J. P. BOATMAN, OF COMPTON, CALIFORNIA, ASSIGNORS TO SAID PINDER.

WASTE-PIPE TRAP.

1,198,759.  Specification of Letters Patent.  Patented Sept. 19, 1916.

Application filed October 12, 1915. Serial No. 55,420.

*To all whom it may concern:*

Be it known that we, RICHARD PINDER and JOHN J. P. BOATMAN, both citizens of the United States, residing, respectively, at Elftman and Compton, Los Angeles county, California, have jointly invented new and useful Improvements in Waste-Pipe Traps, of which the following is a specification.

This invention relates to waste-pipe traps, and it has for its object to provide a trap for use in connection with sinks and other plumbing fixtures, which will permit the free flow of waste liquid therethrough, prevent the passage of sewer gas, and which may be easily kept free from sediment or other matter tending to clog the same; in standard trap constructions, a U-shaped bend in the waste-pipe is provided to permit the formation of a water seal between the plumbing fixture and the sewer, and sediment soon collects in such trap, clogging the same and stopping the outflow of the waste water to the sewer. The cleaning of a standard trap so clogged by sediment is usually attended with great difficulty, various devices being resorted to to force the sediment out of the lower portion of the trap, and in many cases the small plug provided at the lowermost portion of the trap must be removed by a plumber equipped with suitable tools. After removal of the plug it is necessary to use a wire or the like to punch out the accumulated sediment.

In accordance with the present invention, the pipe section forming the U or trap portion is so constructed and organized that the trap may be readily cleaned and in one embodiment of the invention, the lower portion of the trap is detachable from the upper or fixed portion, quick-detachable means being provided to unite the two parts of the trap, the parting line of the trap being preferably horizontal and high enough in the trap to permit the removal of a considerable section or portion of the trap bottom for cleansing purposes and the preferred form of quick-detachable means employed require no tools for the manipulation of the same in the release and securing of the detachable portion of the trap.

A further feature of the invention is the provision of a drain cock connecting with the trap at its lowermost portion, a gage glass being preferably interposed between such cock and the trap so that the trap may be readily cleaned by simply turning the cock, the gage glass serving as a means for indicating when such cleansing of the trap is desirable and upon the appearance of sediment in such gage glass the cock may be turned to drain the trap, thus washing out the sediment before too much sediment accumulates in the trap.

The invention has for further objects the provision of improvements of the general character stated, which will be relatively simple and inexpensive in construction and organization, when taken into consideration with facility of manipulation, positiveness of operation, and compactness in form and durability.

With the above and other objects in view, the invention consists in the novel and useful provision, formation, construction, combination and relative arrangement of parts, members and features, all as hereinafter described, shown in the drawing and finally pointed out in claims.

In the drawing: Figure 1 is a fragmentary side elevation of a waste-pipe provided with a trap organized and constructed in accordance with the invention; Fig. 2 is a central vertical sectional view of a modified form of trap; Fig. 3 is a central vertical sectional view of the detachable portion of a still further modified form of trap; Fig. 4 is a plan view of the detached portion of a trap shown in Fig. 3; and Fig. 5 is a vertical sectional view taken on the line $x^5$—$x^5$, Fig. 1 and looking in the direction of the appended arrows.

The parts are designated by reference characters in the several figures.

Referring with particularity to the drawing, in the embodiment of the invention shown in Figs. 1 and 5, A designates a fragmentary portion of a sink at the point where it is connected with the waste-pipe, B designates the waste-pipe leading to a sewer, C designates a trap which the waste-pipe is interrupted to receive, D designates means for detachably holding the trap portions in assemblage, E designates indicating means, and F designates draining means.

The trap C comprises an upper U-shaped portion *a* and a lower portion *b*, which are united by the holding means D. The upper portion *a* of the trap C has one end 6 secured to a section 7 of the waste-pipe leading from the sink, by means of a union or coupling 8, the other end of the portion *a* being united with a section 9 of the waste-pipe by means of a coupling or union 10. The section *b* of the trap C is preferably so shaped that when clamped onto the portion *a*, the general appearance of the trap is similar to traps of standard construction, such portion *b* consisting of a shell having a seat 11 for a gasket 11$^a$ which gasket insures a tight joint between the portion *b* and the portion *a* of the trap.

The holding means D comprises a split metallic band 12 passed about the trap portions *a* and *b*, and a bolt 13 which passes through suitable apertures in lugs 14 and 15. A wing-nut 16 is provided on the threaded portion 17 of the bolt and a compression spring 18 may be provided between the head 19 of the bolt and the lug 14, to compensate for contraction and expansion of the metal of the trap. An upstanding wall 20 is provided on the portion *b* of the trap and seats in the complementarily formed upper portion *a*, the gasket 11$^a$ encircling such upstanding portion and being clamped between the face 21 of the portion *a* and the face 22 of the portion *b*.

The indicating means E and draining means F are preferably comprised within a cock device *d* which is provided at one end with a plug 23 and threaded at its other end as at 24 into the lowermost portion of the member *b*, sight openings 25 and 26 being provided in the stem 27 of the cock device, in which a gage glass 28 is cemented as at 29. The sight openings 25 are preferably positioned ninety degrees apart about the axis of the stem from the sight openings 26. The cock key or plug cock 23 has an orifice 23$^a$ therein which may be brought into registration with the bore 23$^b$ of the device.

The modified form shown in Fig. 2 preferably comprises an upper trap portion *e* and a lower trap portion *f* formed as are the portions *a* and *b* of the form just described, except that a bolt hole 27 is provided in the upper portion *e* and a bolt hole 28 is provided in the lower portion *f* so that a bolt 29 may be passed through the portions *e* and *f*, centrally thereof, to unite such portions, a wing-nut 30 being provided on the threaded end 29$^a$ of the bolt 29 and a compression spring 31 may be provided between the head 29$^b$ of the bolt 29 and the wall of the member *f*. The stem 27 of an indicating and draining device such as that described in connection with Figs. 1 and 2 may be threaded into a suitable orifice 32 as at 27$^a$, and at or near the lowermost point in the portion *f*. The member *f* is provided with an upstanding wall 20 fitting into the member *e*, a gasket 11$^a$ being interposed between the members *e* and *f*.

In the modified form shown in Figs. 3 and 4, the lower member consists of a shell 33 similar to the members *b* and *f* hereinbefore described, and such shell 33 is provided with an upstanding wall 20 adapted to fit into a member such as *a* or *e* hereinbefore described, the indicating and draining means being, however, omitted in this modified form. An aperture 34 may be provided centrally of the shell 33 through which a bolt similar to the bolt 29 shown in Fig. 2, may be passed to unite the shell 33 with an upper member, or such aperture 34 may be omitted and holding means such as holding means D, described in connection with Figs. 1 and 2, may be employed in lieu of the bolt.

The operation, method of use and advantages of the improved waste-pipe trap will be readily understood from the foregoing description, taken in connection with the accompanying drawing and the following statement: When it is desired to remove the sediment or other accumulated matter in the trap it is only necessary to give the wing-nut a few turns to loosen the band 12 which encircles, wholly or in part, the trap at the point of union of the respective members of such trap, and then slide the band, so loosened, along the trap until it encircles only the upper member thereof, and the freed lower member may be readily removed, or will fall, thus parting the trap or separating it into two portions, which portions may be readily cleaned. The above applies to Figs. 1 and 5, and in connection with Fig. 2 it is only necessary to state that by unscrewing the wing-nut 30, the lower portion of the trap may be removed. When sediment lodges in the trap it will be noticed at the sight openings 25 and 26 provided in the indicating and draining device, and as soon as such sediment makes its appearance, the cock or valve key 23 may be turned to discharge the contents of the trap, thus washing out such sediment. In the form shown in Figs. 3 and 4, no draining or indicating means are employed, and it will be understood that many other variations and departures from the showing herein may be made, such as employing the indicating and draining means in connection with traps other than the forms shown in Figs. 1, 2 and 5, without departing from the spirit of the invention and the terms of the following claims.

Having thus disclosed our invention, we claim and desire to secure by Letters Patent:

1. A waste-pipe trap, comprising an upper U-shaped trap portion forming in part a conduit for waste-fluid, a lower trap portion completing said conduit, and quick-detachable means for uniting said trap portions, said lower trap portion consisting of a hollow elliptical shell, 2. A waste-pipe trap, comprising an upper U-shaped trap portion forming in part a conduit for waste-fluid, a lower trap portion completing said conduit, a sighting device, and a cock below said sighting device for draining said trap.

In testimony whereof, we have signed our names to this specification in the presence of two subscribing witnesses.

RICHARD PINDER.
JOHN J. P. BOATMAN.

Witnesses:
ALFRED H. DAEHLER,
FRANCIS L. ISGRIGG.